US007685381B2

(12) United States Patent
Bohizic et al.

(10) Patent No.: US 7,685,381 B2
(45) Date of Patent: Mar. 23, 2010

(54) EMPLOYING A DATA STRUCTURE OF READILY ACCESSIBLE UNITS OF MEMORY TO FACILITATE MEMORY ACCESS

(75) Inventors: Theodore J. Bohizic, Hyde Park, NY (US); Mark H. Decker, Rhinebeck, NY (US); Viktor S. Gyuris, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 11/680,703

(22) Filed: Mar. 1, 2007

(65) Prior Publication Data

US 2008/0215830 A1  Sep. 4, 2008

(51) Int. Cl.
   *G06F 12/06*   (2006.01)
(52) U.S. Cl. .................................. 711/156
(58) Field of Classification Search ............. 711/154, 711/156, 170, 202, 203
   See application file for complete search history.

(56) References Cited

U.S. PATENT DOCUMENTS

| 2003/0093649 | A1 | 5/2003 | Hilton ..................... 712/41 |
| 2004/0078186 | A1 | 4/2004 | Nair et al. |
| 2006/0047856 | A1* | 3/2006 | Tripathi ................... 709/250 |
| 2006/0095793 | A1* | 5/2006 | Hall ........................ 713/190 |

FOREIGN PATENT DOCUMENTS

GB  2132797  7/1984
WO  WO9829805 A1  7/1998
WO  WO0116738 A2  3/2001

OTHER PUBLICATIONS

Memory Coherence in Shared Virtual Memory Systems, Kai Li and Paul Hudak, Proc. 5th Ann. ACM Symposium on Distributed Computing (Aug. 1986), pp. 229-239.
"z/Architecture—Principles of Operation," SA22-7832-04, Fifth Edition, Sep. 2005, pp. 3-47-3-53.
Notification of Transmittal of the International Search Report and The Written Opinion of the International Searching Authority, or the Declaration for PCT/EP2008/052260.
"ESA/390 Interpretive-Execution Architecture, Foundation for VM/ESA," Osisek et al., IBM Systems Journal, vol. 30, No. 1, Jan. 1, 1991, pp. 34-51.
"A Simulation Based Study of TLB Perofrmance," Chen et al., Computer Architecture News, vol. 20, No. 2, May 1, 1992, pp. 114-123.
"z/Architecture—Principles of Operation," SA22-7832-04, Sep. 1, 2005, IBM, pp. 3-31-3-52 and 4-22-4-35.
Smith, James & Ravi Nair, "Virtual Machines—Versatile Platforms for Systems and Processes," Morgan Kaufmann Publishers, 2005, pp. 27-82, 114-133, 304-320.

* cited by examiner

*Primary Examiner*—Pierre-Michel Bataille
(74) *Attorney, Agent, or Firm*—John E. Campbell; Blanche E. Schiller, Esq.; Heslin Rothenberg Farley & Mesiti P.C.

(57) ABSTRACT

A data structure of readily accessible units of memory is provided. The data structure includes designations of one or more units of memory that while represented in the data structure do not need expensive address translation, other tests or special handling in order to access the units of memory. By employing such a data structure, memory access and system performance are enhanced.

26 Claims, 6 Drawing Sheets under the covers, another architecture (referred to as a guest architecture). As examples, the native architecture is the Power4 or PowerPC® offered by International Business Machines Corporation, Armonk, N.Y., or an Intel® architecture offered by Intel Corporation; while the guest architecture is the z/Architecture® also offered by International Business Machines Corporation, Armonk, N.Y. Aspects of the z/Architecture® are described in "z/Architecture Principles of Operation," IBM Publication No. SA22-7832-04, September 2005, which is hereby incorporated herein by reference in its entirety.

EMPLOYING A DATA STRUCTURE OF READILY ACCESSIBLE UNITS OF MEMORY TO FACILITATE MEMORY ACCESS

TECHNICAL FIELD

This invention relates, in general, to improving performance of a processing environment, and in particular, to facilitating access to memory of the processing environment by efficiently determining those units of memory that are readily accessible.

BACKGROUND OF THE INVENTION

Enhancement of system performance continues to be an important aspect in designing and configuring processing environments. One way to improve system performance is to improve memory access.

Currently, there exist mechanisms to perform memory address translations and to maintain those translated addresses in a buffer for easy access. The buffer is checked, in response to a memory access request, to determine if an address specified in the request is in the buffer. If it is in the buffer, the address is retrieved from the buffer and used to perform the memory access. This avoids re-translation of the address.

By maintaining the translated addresses in the buffer, economies of time are realized. However, although time is saved by maintaining those translations, other tests may still need to be performed for the page of memory specified in the memory access request. Thus, the memory page may not be readily accessible.

SUMMARY OF THE INVENTION

Based on the foregoing, a need still exists for a capability that further enhances system performance, and in particular, memory access. For example, a need exists for a capability that enables a memory page or other unit of memory to be readily accessible. That is, a need exists for a data structure of readily accessible units of memory (e.g., pages), in which, in response to representing a unit of memory in the data structure, address translation and further testing, such as access monitoring, are not performed for the unit of memory. The unit of memory is ready for access.

The shortcomings of the prior art are overcome and additional advantages are provided through the provision of an article of manufacture that includes at least one computer usable medium having computer readable program code logic to facilitate access to memory of a processing environment. The computer readable program code logic when executing performing, for instance, the following: checking a data structure of the processing environment to determine whether a unit of memory is readily accessible, the data structure representing one or more units of memory that are readily accessible and excluding units of memory that are not readily accessible, wherein a unit of memory represented in the data structure is a unit of memory that is accessible and a determination has been made that accesses to that unit of memory do not require monitoring; and using a designation in the data structure to access the unit of memory, in response to the checking indicating the unit of memory is readily accessible.

Systems and methods relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, memory access is facilitated and system performance is enhanced by a capability that efficiently indicates those units of memory that are readily accessible. A unit of memory is readily accessible if address translation is not currently needed for the unit of memory (i.e., address translation has already been performed and the address is obtainable, or address translation is not needed), and if no other tests relating to the unit of memory, including access monitoring, need to be performed to access the unit of memory (i.e., there are no tests or they have previously been completed and do not need to be completed at the time of access).

If a unit of memory falls within this category, then a designation (e.g., one or more addresses) of that unit of memory is placed in a data structure, referred to herein as Translation Lookaside Buffer 0 (or TLB0). TLB0 includes designations of those units of memory that are immediately ready for access. While a unit of memory is in TLB0, no. address translations or other tests relating to the unit of memory are performed. The unit of memory is ready for read/write access.

Figure 1:
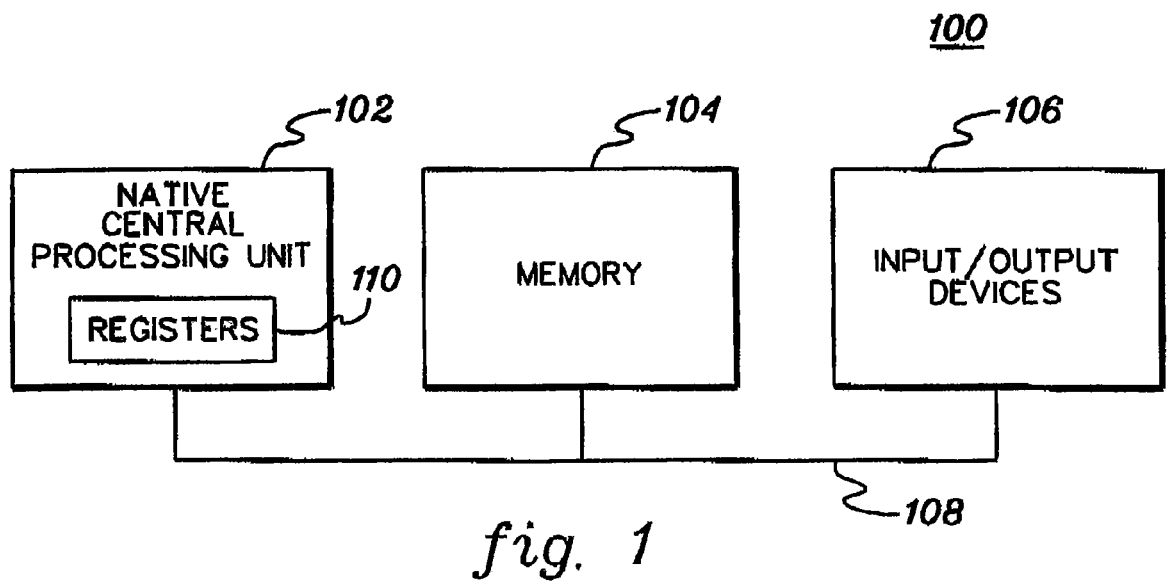
FIG. 1 depicts one embodiment of a processing environment to incorporate and use one or more aspects of the present invention.

One embodiment of a processing environment to incorporate and use one or more aspects of the present invention is described with reference to FIG. 1. In this example, a processing environment 100 is based on one architecture, which may be referred to as a native architecture, but emulates another architecture, which may be referred to as a guest architecture. As examples, the native architecture is the Power4 or PowerPC® architecture offered by International Business Machines Corporation, Armonk, N.Y., or an Intel® architecture offered by Intel Corporation; and the guest architecture is the z/Architecture® also offered by International Business Machines Corporation. Aspects of the z/Architecture® are described in "z/Architecture Principles of Operation," IBM Publication No. SA22-7832-04, September 2005, which is hereby incorporated herein by reference in its entirety.

Processing environment 100 includes, for instance, a native processor 102 (e.g., central processing unit (CPU)), a memory 104 (e.g., main memory), and one or more input/output (I/O) devices 106 coupled to one another via, for example, one or more buses 108 or other connections. As one example, processor 102 is part of a pSeries® server offered by International Business Machines Corporation (IBM®), Armonk, N.Y. IBM®, pSeries®, PowerPC® and z/Architecture® are registered trademarks of International Business Machines Corporation, Armonk, N.Y., U.S.A. Intel® is a registered trademark of Intel Corporation. Other names used herein may be registered trademarks, trademarks or product names of International Business Machines Corporation or other companies.

Native central processing unit 102 includes one or more native registers 110, such as one or more general purpose registers and/or one or more special purpose registers, used during processing within the environment. These registers include information that represent the state of the environment at any particular point in time.

To provide emulation, the processing environment is architected to include an emulator, a guest operating system and one or more guest applications. These architected features are further described with reference to FIG. 2.

Figure 2:
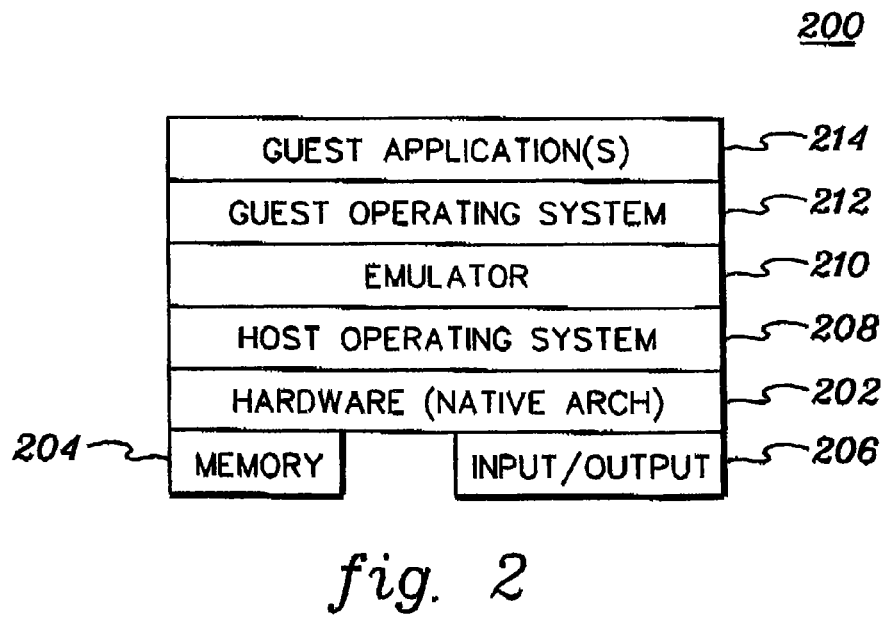
FIG. 2 depicts one embodiment of a system architecture of the processing environment of FIG. 1, in accordance with an aspect of the present invention.

Referring to FIG. 2, one embodiment of a system architecture 200 of processing environment 100 is described. System architecture 200 includes, for instance, a plurality of implementation layers, which define the architected aspects of the environment. In this particular example, the layers include hardware 202, which is coupled to memory 204 and input/output devices and/or networks 206 via one or more interfaces and/or controllers; a host operating system 208; an emulator 210; a guest operating system 212; and one or more guest applications 214; as examples. One layer is coupled to at least one other layer via one or more interfaces. For instance, guest applications 214 are coupled to guest operating system 212 via at least one interface. Other interfaces are used to couple the other layers. Moreover, the architecture can also include other layers and/or interfaces. Various of the layers depicted in FIG. 2 are further described below.

Hardware 200 is the native architecture of the processing environment and is based on, for instance, Power 4, PowerPC®, Intel®, or other architectures. Running on the hardware is a host operating system 202, such as AIX® offered by International Business Machines Corporation, or LINUX. AIX® is a registered trademark of International Business Machines Corporation.

Emulator 210 includes a number of components used to emulate an architecture that differs from the native architecture. In this embodiment, the architecture being emulated is the z/Architecture® offered by IBM®, but other architectures may be emulated as well. The emulation enables a guest operating system 212 (e.g, z/OS®, a registered trademark of International Business Machines Corporation) to execute on the native architecture and enables the support of one or more guest applications 214 (e.g., Z applications). Further details regarding emulator 210 are described with reference to FIG. 3.

Figure 3:
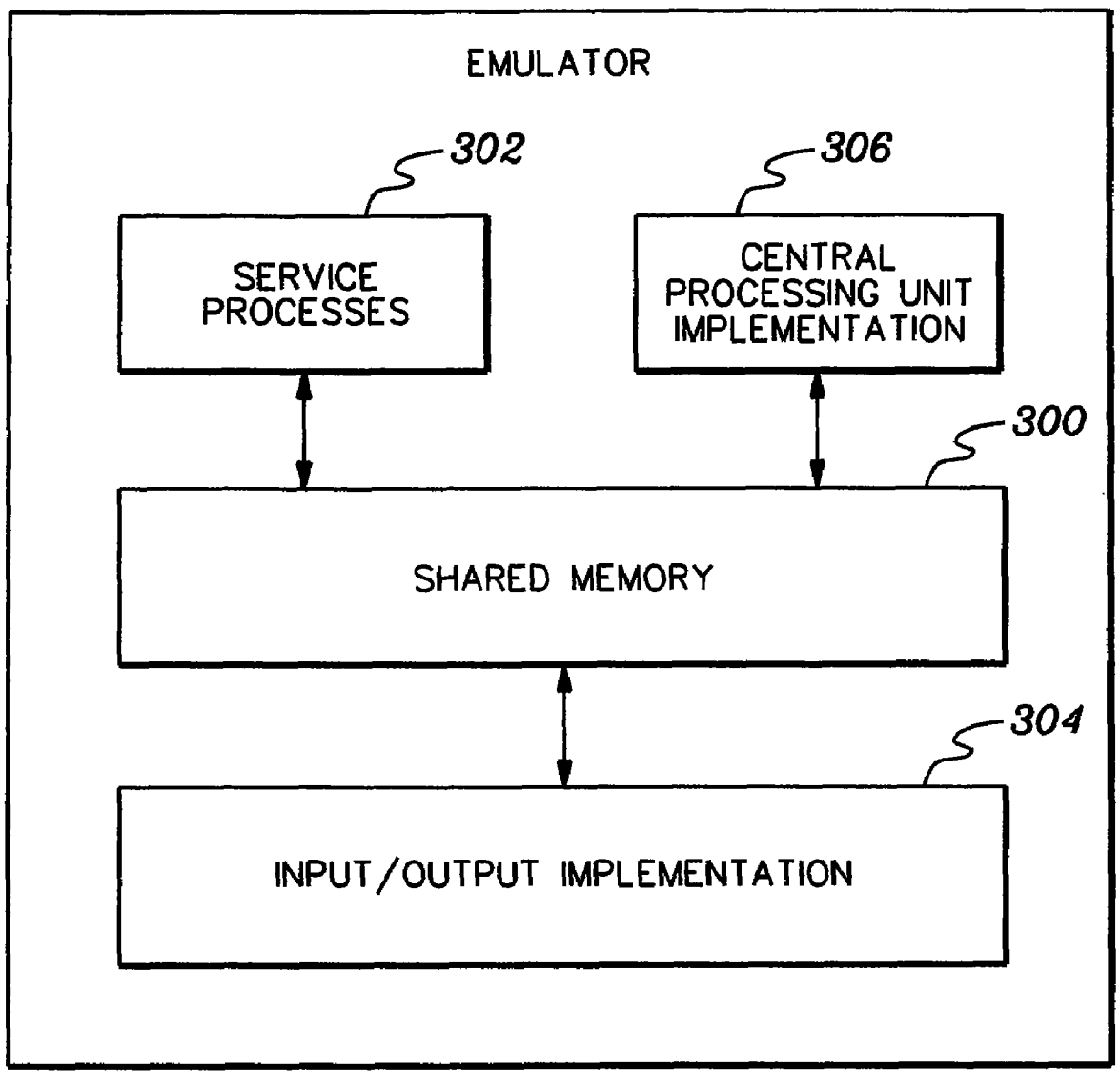
FIG. 3 depicts further details of one embodiment of an emulator of the system architecture of FIG. 2, in accordance with an aspect of the present invention.

Referring to FIG. 3, emulator 210 includes a shared memory 300 coupled to one or more service processes 302, an input/output (I/O) implementation 304, and a central processing unit (CPU) implementation 306, each of which is described in further detail below.

Shared memory 300 is a representation of a portion of memory in the host that is visible from service processes 302, I/O implementation 304, and CPU implementation 306. It is a storage area in which the independent processes (e.g., service processes, I/O implementation, CPU implementation) communicate by reading and storing data into the shared memory. As one example, the shared memory includes a plurality of regions including, for instance, system global information, CPU contexts and information, emulated main storage, emulated main storage keys, and subchannels (i.e., data structures that represent I/O devices).

Service processes 302 include one or more processes used to create the CPUs and one or more other processes, as well as provide architected operator facilities, such as start, stop, reset, initial program load (IPL), etc. It may also provide other functions, such as displays or alteration of emulated system facilities, obtaining/freeing shared resources, other maintenance commands, etc.

Input/output implementation 304 includes, for instance, one or more subchannel processes and an I/O controller used to communicate with I/O devices. The I/O controller is responsible for starting the subchannel processes and performing recovery, in one aspect of the present invention.

Central processing unit (CPU) implementation 306 is responsible for executing instructions and managing the processing. It includes a number of components, which are described with reference to FIGS. 4A-4B.

Figure 4A:
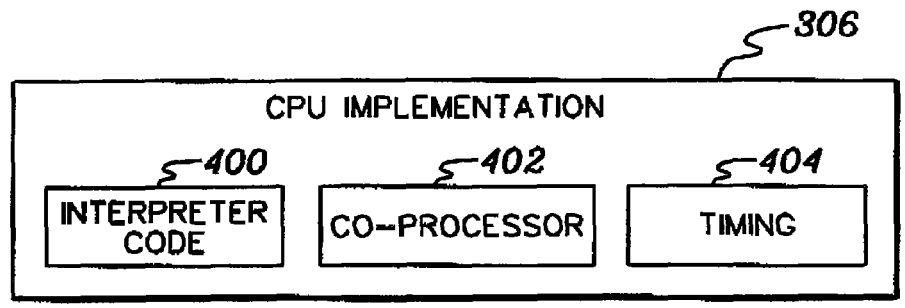
FIG. 4A depicts further details of one embodiment of a central processing unit (CPU) implementation of the emulator of FIG. 3, in accordance with an aspect of the present invention.
Figure 4B:
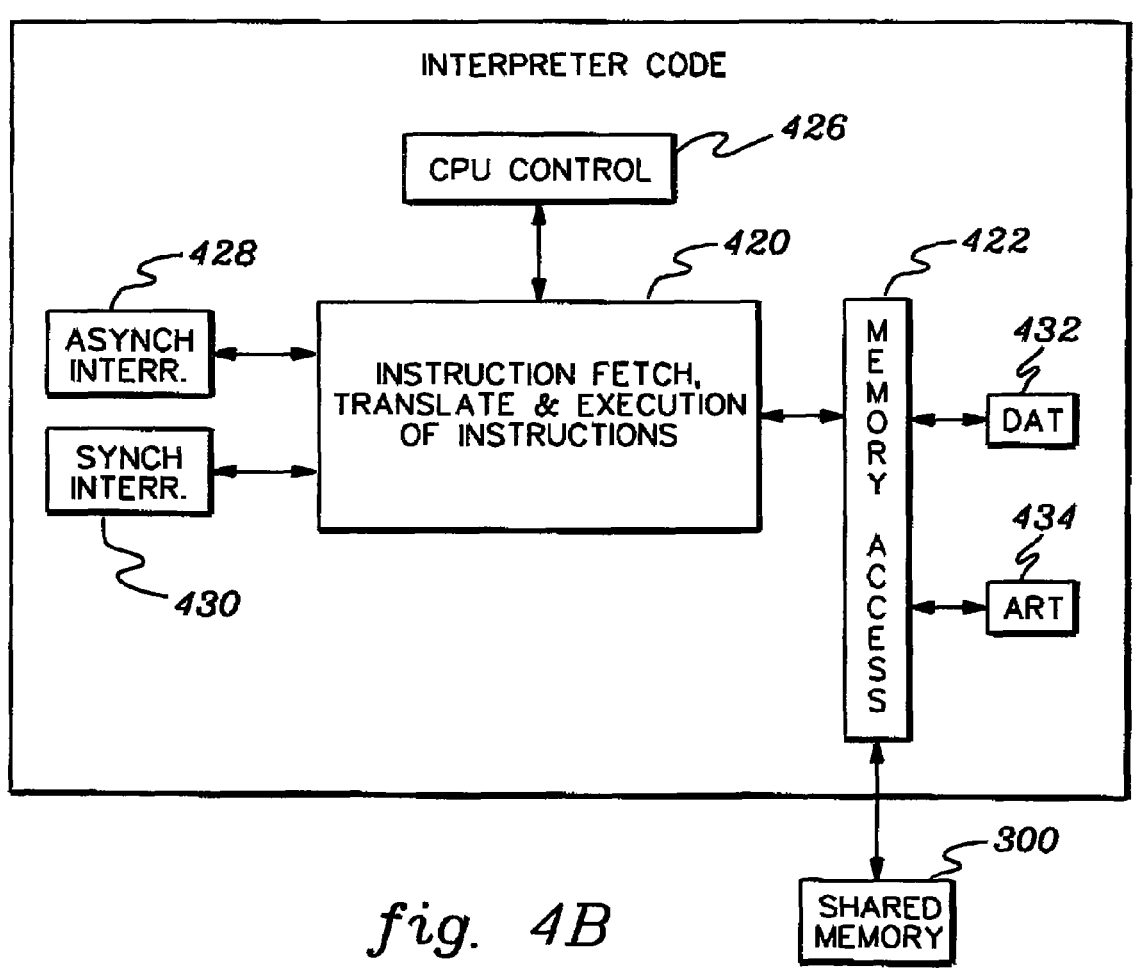
FIG. 4B depicts further details of one embodiment of interpreter code of the CPU implementation of FIG. 4A, in accordance with an aspect of the present invention.

Referring to FIG. 4A, CPU implementation 306 includes, for instance, interpreter code 400 used to fetch, translate and execute instructions; an architectured co-processor 402 that aids in initial start-up and communication with the chip (e.g., Service Call Logical Processor (SCLP) processes); and timing facilities 404 that are responsible for timing functions of the emulator. Further details regarding interpreter code 400 are described with reference to FIG. 4B.

Interpreter code 400 includes, for instance, an interpretation unit 420 coupled to a memory access unit 422, a CPU control 426, an asynchronous interruption handler 428 and a synchronous interruption handler 430.

Interpretation unit 420 is responsible for obtaining one or more guest instructions from memory, providing native instructions for the guest instructions, and executing the native instructions. The guest instructions comprise software instructions (e.g., machine instructions) that were developed to be executed in an architecture other than that of native CPU 102. For example, the guest instructions may have been designed to execute on a z/Architecture® processor, but are instead being emulated on native CPU 102, which may be, for instance, a pSeries® server.

In one example, the providing of the native instructions includes selecting a code segment in the emulator that is associated with the guest instruction. For instance, each guest instruction has an associated code segment in the emulator, which includes a sequence of one or more native instructions, and that code segment is selected to be executed.

In a further example, the providing includes creating during, for instance, a translation process, a native stream of instructions for a given set of guest instructions. This includes identifying the functions and creating the equivalent native instructions.

If an instruction includes a memory access, then memory access routines 422 are used to access shared memory 300. The memory access routines may use translation mechanisms such as dynamic address translation (DAT) 432 or access register translation (ART) 434 to translate a logical address to an absolute address, which is then used to access the memory or may be further translated, if needed.

In this embodiment, the processing within interpretation unit 420 is to be streamlined. Thus, if a more complex circumstance arises, such as a wait state, changing from one architecture level to another architecture level (e.g., z/Architecture® to ESA/390, etc.), control is transferred to CPU control 426, which handles the event and then returns control to interpretation unit 420.

Further, if an interrupt occurs, then processing transitions from interpretation unit 420 to either asynchronous interruption handler 428, if it is an asynchronous interruption, or synchronous interruption handler 430, if it is a synchronous interruption. After the interrupt is handled, processing returns to interpretation unit 420.

In particular, the interpretation unit monitors certain locations in shared memory and if a location has changed, it signifies an interrupt has been set by the CPU or I/O. Thus, the interpretation unit calls the appropriate interruption handler.

To facilitate memory access, some architectures, such as the z/Architecture® offered by International Business Machines Corporation, use a Translation Lookaside Buffer, referred to herein as TLB1, to store addresses that have been translated by DAT or ART, as examples. Then, when a request is received for a page of memory addressed by a translated address, the address is used without having to wait for the expensive translation to be performed.

Although TLB1 includes designation of pages of memory that have been address translated, a page represented in TLB1 still may not be readily accessible. Instead, one or more other tests, such as access monitoring, may need to be performed before the page can be accessed. Thus, in accordance with an aspect of the present invention, a data structure, referred to herein as TLB0, is provided that includes one or more addresses (or other designations) of pages (or other units) of memory that are immediately accessible in that address translation has been performed and no tests need to be performed at this time to access the memory page. For example, if an address of the page of memory has been address translated and access to that page does not require monitoring, then the page is represented in TLB0. Thus, if translation and any other required tests (e.g., access monitoring) have previously been performed for a page of memory and do not need to be repeated at memory access time, one or more addresses of that page are placed in TLB0.

Figure 5:
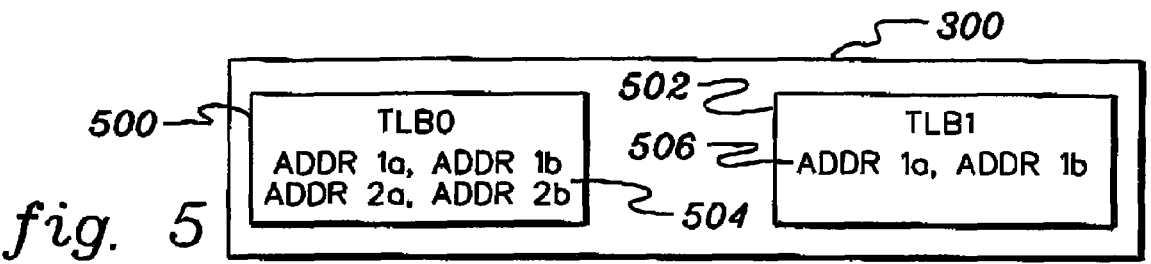
FIG. 5 depicts one embodiment of an overview of translation lookaside buffers used in accordance with an aspect of the present invention.

As shown in FIG. 5, TLB0 500, as well as TLB1 502, reside in shared memory 300, and in particular, in the CPU contexts and information region of shared memory, in one example.

TLB0 500 is a collection of data. The data includes designation of one or more units of memory known to be accessible to the CPU. As one example, TLB0 includes, for instance, a pair of designations 504 for each unit of memory that is readily accessible. That is, when a unit of memory is represented in TLB0, it is known that it does not require the expensive address translations or any tests. In particular, it does not need address translation or access monitoring relating to the unit of memory. The designations are substantially immediately usable to access the unit of memory. As one example, each pair of designations includes a logical address and a host absolute address. In other embodiments, however, each pair of designations may include other types of addresses or other types of designations used to identify a unit of memory, such as a page of memory.

In one embodiment, there is a TLB0 for instructions that are to be fetched from memory and a TLB0 for data (e.g., operands, pages, etc.) that is to be fetched from memory. That is, in one example, there are separate TLB0s for different purposes. This is for performance enhancement. In other embodiments, there may be more or less TLB0s than described herein.

Similar to TLB0, TLB1 502 also includes a pair of designations for each unit of memory for which address translation has been performed. In one example, TLB1 is comprised of a plurality of TLB1s (e.g., 16 TLBs, one for each address space). Each TLB1 is tagged with the parameters used to create that TLB1. By having multiple TLB1s, as an operating system proceeds through sets of address spaces (at least one address space per process), the TLB1s retain translation information for multiple processes.

The TLB1s have an address space match criteria. The attributes that define a TLB1 are host or guest (SIE) information and the translation table origins as described in "z/Architecture Principles of Operation," IBM Publication No. SA22-7832-04, September 2005. When dynamic address translation parameters change, then the TLB1s are scanned for a parameter match. If no match, then the least recently used TLB1 is replaced and a new TLB1 is constructed.

During processing, the instruction fetching and operand accessing mechanisms can be using different TLB1s. In access register mode, each access register can specify a different TLB1. This is accomplished by having TLB1 anchors. Once a TLB1 is assigned to an address space, the TLB1 scan is avoided for each TLB0 miss. That is, a pointer is used to point to the current TLB1.

When address space parameters change, two actions are taken. The TLB0 is purged and the TLB1 anchors are cleared to zero. Memory accesses from that point miss TLB0 and drop down into the TLB1 code. The TLB1 code checks for a zero TLB1 anchor, and if the anchor is zero, performs a TLB1 selection. Otherwise TLB1 selection can be avoided for future memory accesses. The TLB1 lookup from that point on is a hash function based on bits from the virtual address.

A unit of memory that is in TLB1 may or may not be in TLB0, depending on whether access monitoring or other special testing is required. If no access monitoring or other testing is required, then the unit of memory in TLB1 can also be included in TLB0. A unit of memory in TLB0 is also in TLB1.

Figure 6:
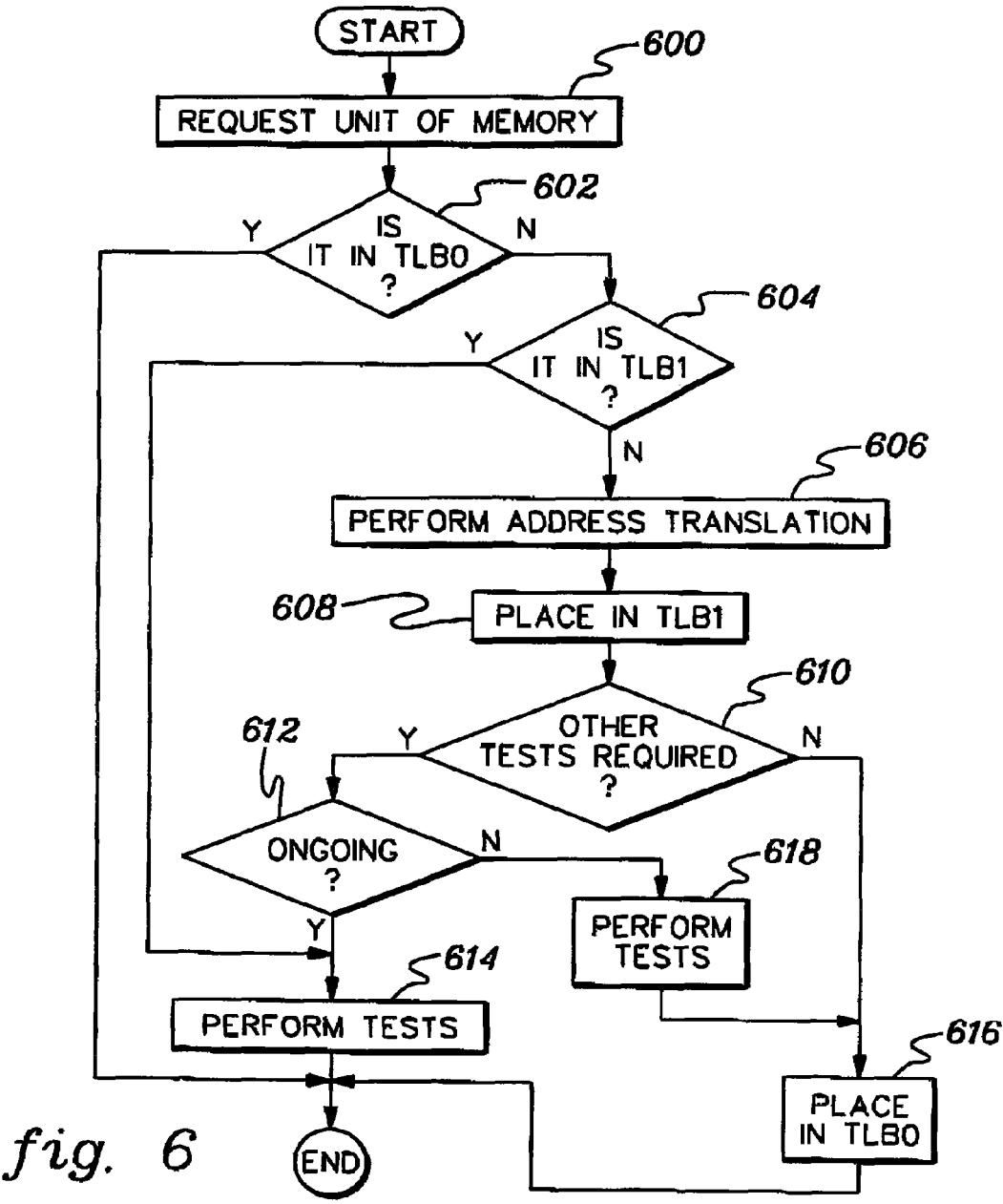
FIG. 6 depicts one embodiment of the logic associated with placing units of memory in the buffers of FIG. 5, in accordance with an aspect of the present invention.

In accordance with an aspect of the present invention, a unit of memory is placed in TLB0 when, for instance, it is determined that any necessary or desired address translations or tests for that unit of memory are complete. In one example, the tests refer to access monitoring. Thus, if address translation for the unit of memory is complete (or not needed) and access to that unit of memory do not need to be monitored, as described in further detail below, then a designation of the unit of memory can be placed in TLB0. This is described in further detail with reference to FIG. 6.

In one embodiment, in response to the memory access component obtaining (e.g., receiving, having, fetching, being provided) a request for access of a particular unit of memory (e.g., a page of memory, or other size of memory), STEP 600, a determination is made as to whether a designation (e.g., address or other identifier of the unit of memory) is in TLB0, INQUIRY 602. If it is in TLB0, then this processing concludes and the memory access is performed using the designation in TLB0, as described further below with reference to FIG. 7.

However, if the designation is not in TLB0, then a further inquiry is made as to whether it is in TLB1, INQUIRY 604. If it is in TLB1 and not TLB0, then address translation has already been performed, and it is assumed that ongoing checks or further testing for this unit of memory are required, and therefore, it is ineligible for placement in TLB0. Thus, processing continues with perform tests, STEP 614, and the designation in TLB1 is usable for memory access, after the other tests are performed. However, in another embodiment, instead of assuming other tests are required, processing may continue with INQUIRY 610, as described below. This is beneficial in those situations in which the other tests are no longer required, and therefore, the unit of memory can be upgraded to TLB0.

Returning to INQUIRY 604, if the designation is not in TLB0 or TLB1 (e.g., first time the unit of memory is being accessed or the first time it is being accessed after a change causing translation to re-occur and/or other checks to be made once again), address translation is performed for the unit of memory, STEP 606. Any known address translation can be performed, including DAT and ART, as examples. Examples of DAT and ART are described in "z/Architecture Principles of Operation," IBM Publication No. SA22-7832-04, September 2005.

Subsequent to performing address translation, the unit of memory is placed in TLB1, STEP 608. For example, the logical address and host absolute address for the unit of memory is placed in TLB1. By placing the unit of memory in TLB1, its designation is usable to access the unit of memory without requiring performance of the expensive address translations. TLB1 lookup from that point on includes a hash function based on bits from the virtual address.

Moreover, a determination is made as to whether one or more other checks are necessary or desired to access the unit of memory, INQUIRY 610. In particular, a determination is made as to whether access of this unit of memory requires monitoring. As examples, a determination is made as to whether the unit of memory is subject to PER (Program Event Recording) monitoring or Store Stop monitoring; whether monitoring is needed to determine whether a store is into JITed (Just-in-Time compiled) code (i.e., cached code); whether the unit of memory is page 0; or whether any other tests (e.g., any tests, checks, conditions, etc.) apply. Performing these checks is described below.

For example, to determine if a page of memory has JITed code, and thus, is to be monitored, an indicator in a descriptor in the absolute page is checked that specifies whether there is JITed code. If the indicator specifies JITed code, then the page is ineligible for TLB0. As a further example, to determine if PER is active, the page address is compared to the beginning and ending of a defined PER range. If it falls within the range, the page is ineligible for TLB0. Similar testing is performed for Store Stop in which the page address is compared to a given range.

Should these tests be required, another inquiry is made as to whether those tests are ongoing, INQUIRY 612. That is, if the test cannot be satisfied by performing it once during this processing, but needs to be performed before each memory access or multiple times, then the unit of memory is not eligible for TLB0. Therefore, the tests are performed, STEP 614, and the unit of memory is accessible as appropriate, based on the tests.

Returning to INQUIRY 610, if no tests are required or desired, then the unit of memory is placed in TLB0, STEP 616. For example, the logical address of the unit of memory and its host absolute address are placed in TLB0.

Likewise, if one or more tests are required or desired, and can be satisfied by performing them one time during this processing (i.e., they do not need to be performed for each memory access or while the unit of memory is in TLB0), then the one or more tests are performed, STEP 618, and the unit of memory is added to TLB0, STEP 616.

When the unit of memory is in TLB0, it signifies that the unit of memory is readily accessible. No expensive address translations or other tests need to be performed in order to access the unit of memory. The unit of memory is accessible (e.g., address translated) and accesses to that unit of memory need not be monitored (i.e., no special handling for the unit of memory). The designation is retrieved from TLB0 and immediately usable (i.e., no tests or substantive translations need to be performed at this point in time) to access the unit of memory. This processing is further described with reference to FIG. 7.

Figure 7:
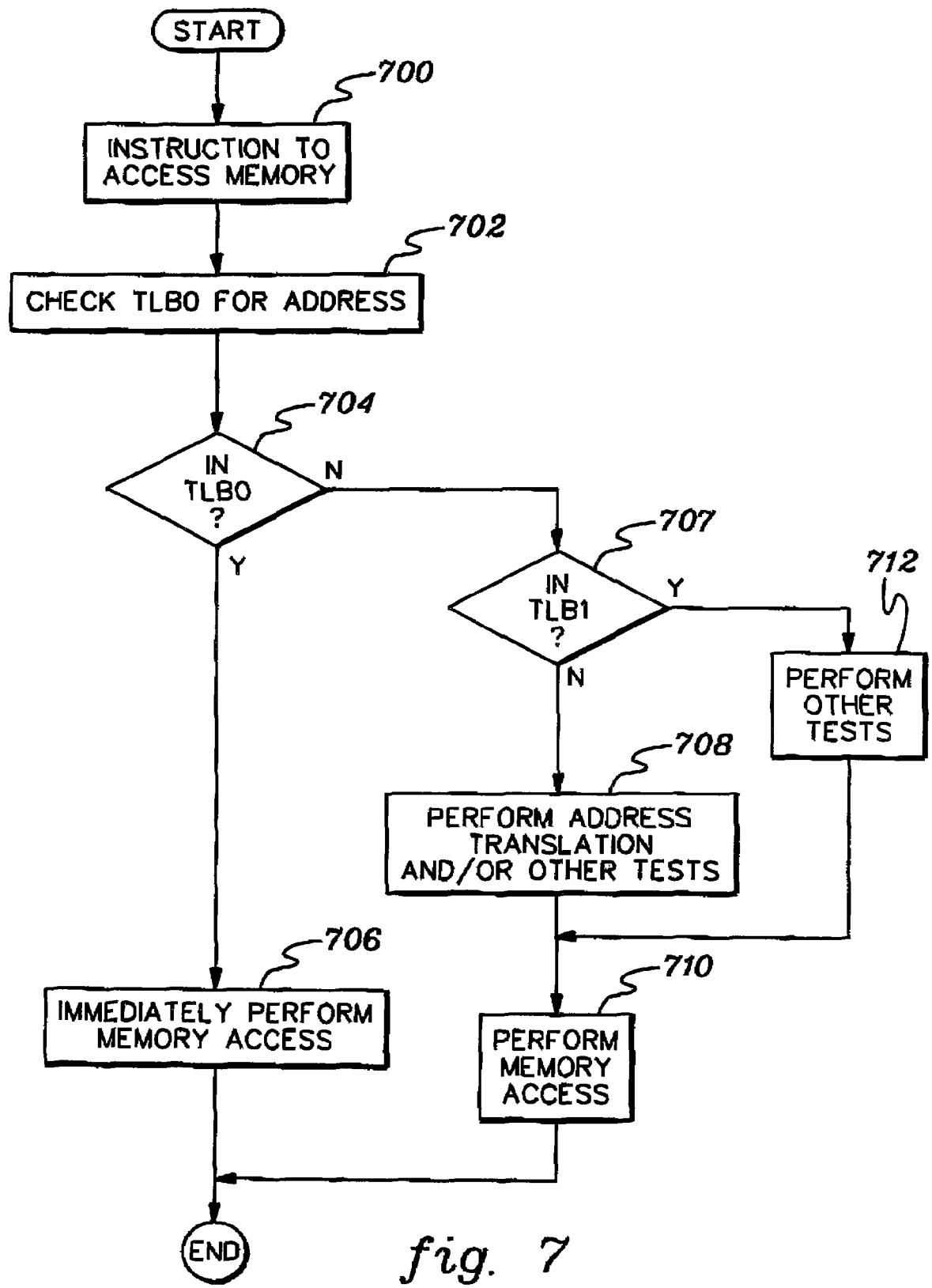
FIG. 7 depicts one embodiment of the logic associated with accessing Translation Lookaside Buffer 0 of FIG. 5, in accordance with an aspect of the present invention.

Referring to FIG. 7, processing associated with employing TLB0 to perform a memory access is described in further detail. This processing is performed by the memory access component, in one embodiment.

Initially, the memory access routines obtain (e.g., receive, fetch, are provided, have, etc.) an instruction or request to access a particular unit of memory, STEP 700. In response to obtaining the request, the memory access component checks whether a designation of the unit of memory is in TLB0, STEP 702. For instance, the logical address provided in the request is used in a hash function into TLB0. If the logical address is found, INQUIRY 704, then the absolute address corresponding to the logical address is obtained and usable in substantially immediately performing the memory access, STEP 706. That is, no expensive address translations or other tests are needed at this time to access the unit of memory.

On the other hand, if the logical address is not in TLB0, then a determination is made as to whether it is in TLB1, INQUIRY 707. If it is not in TLB1, then address translation and/or other tests need to be performed, STEP 708. Subsequent to performing any necessary translations and/or other tests, the unit of memory is accessed, STEP 710. Since address translation and/or one or more other tests are to be performed, the unit of memory is not readily or immediately accessible.

Returning to INQUIRY 707, if the unit of memory is represented in TLB1, but not in TLB0, then accesses to the unit of memory are monitored, STEP 712. That is, one or more special conditions apply that need to be monitored. For instance, if PER is active, a determination is made as to whether in PER range, etc. Subsequent or in addition to handling these conditions, memory access is performed, STEP 710.

During processing, state associated with the unit of memory may change, and therefore, address translation and/or one or more tests may need to be performed. For instance, PER or Store Stop may be made active for a unit of memory. In response to the memory access component making this determination of state change, the designation of the unit of memory is removed from TLB0. In one example, only that designation is removed, but in another example, all of TLB0 is purged and then re-loaded, as described above.

Described in detail herein is a capability to enhance memory access and system performance by providing a data structure that includes designations of those units of memory that are readily accessible. By using TLB0, inline checks do not need to be performed. It is assumed that all of the checks needed to access the unit of memory have been made. In contrast, when a unit of memory is not represented in TLB0, one or more of the monitoring checks (e.g., Is it page 0?, Per active?, Store Stop active?, JITed code?) need to be performed inline (e.g., at the time of access).

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 8:
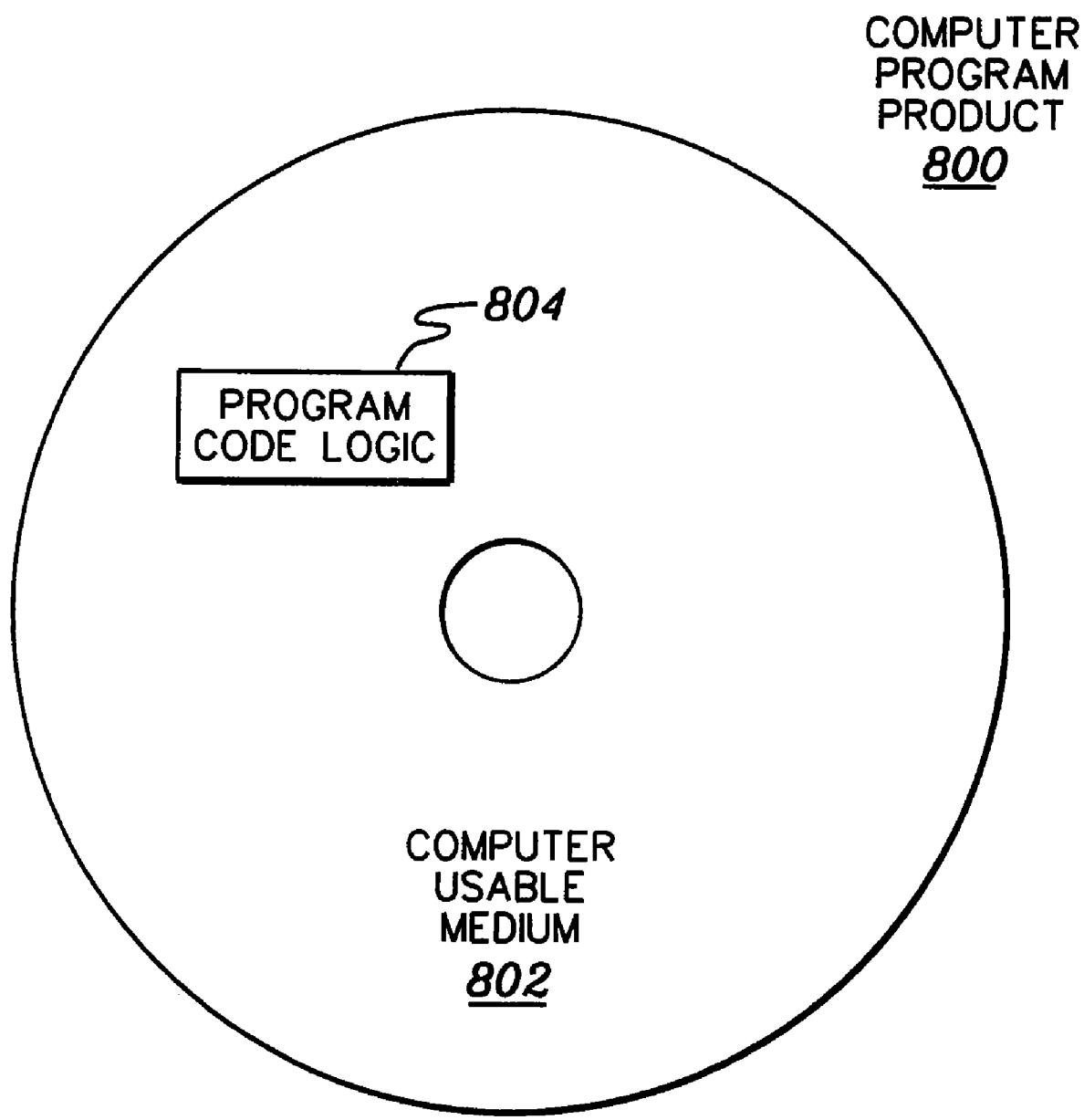
FIG. 8 depicts one embodiment of a computer program product incorporating one or more aspects of the present invention.

One example of an article of manufacture or a computer program product incorporating one or more aspects of the present invention is described with reference to FIG. 8. A computer program product 800 includes, for instance, one or more computer usable media 802 to store computer readable program code means or logic 804 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a data structure of readily accessible units of memory is provided. By employing this data structure, memory access and system performance are enhanced (e.g., faster). The data structure includes designations (e.g., addresses) of one or more units of memory (e.g., pages) that while in the data structure do not need address translation or any other test to be performed in order to access the unit of memory. This data structure can be used in any type of processing environment including emulated environments.

Although various embodiments are described above, these are only examples. For instance, one or more aspects of the present invention can be included in environments that are not emulated environments. Further, one or more aspects of the present invention can be used in emulated environments that have a native architecture that is different than the one described above and/or emulates an architecture other than the z/Architecture®. Various emulators can be used. Emulators are commercially available and offered by various companies. Additional details relating to emulation are described in *Virtual Machines: Versatile Platforms For Systems and Processes* (*The Morgan Kaufmann Series in Computer Architecture and Design*), Jim Smith and Ravi Nair, Jun. 3, 2005, which is hereby incorporated herein by reference in its entirety.

Further, the processing environment can include multiple central processing units, each having an emulator and providing a guest operating system and guest applications. As further examples, the emulator and the various components of the emulator can be different than described herein, or there can be additional or less components than described herein. Additionally, TLB0 and TLB1 can have a different format than that described herein. Although the examples described herein refer to pages as the units of memory, other sizes of memory can also benefit from one or more aspects of the present invention. Further, the designations can be other than addresses, and in particular, can be other than logical and/or host absolute addresses. Many other variations are possible without departing from the spirit of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail there, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating access to memory of a processing environment, said method comprising:
    checking a data structure of the processing environment to determine whether a unit of memory is readily accessible, said data structure representing one or more units of memory that are readily accessible and excluding units of memory that are not readily accessible, wherein a unit of memory represented in the data structure is a unit of memory that is accessible and a determination has been made that accesses to that unit of memory do not require monitoring; and
    using a designation in the data structure to access the unit of memory, in response to the checking indicating the unit of memory is readily accessible.

2. The method of claim 1, wherein the unit of memory is accessible if address translation has already been performed.

3. The method of claim 1, wherein the checking and using are performed in response to a request to access the unit of memory, said request being received by a memory access component of an emulator of the processing environment from an interpreter component of the emulator.

4. The method of claim 1, further comprising removing a designation of a unit of memory from the data structure, in response to an indication that at least one of address translation and access monitoring is to be performed.

5. A computer system for facilitating access to memory of a processing environment, the computer system comprising:
   a memory; and
   a processor in communications with the memory, wherein the computer system is capable of performing a method, said method comprising:
      checking a data structure of the processing environment to determine whether a unit of memory is readily accessible, said data structure representing one or more units of memory that are readily accessible and excluding units of memory that are not readily accessible, wherein a unit of memory represented in the data structure is a unit of memory that is accessible and a determination has been made that accesses to that unit of memory do not require monitoring; and
      using a designation in the data structure to access the unit of memory, in response to the checking indicating the unit of memory is readily accessible.

6. The computer system of claim 5, wherein the unit of memory is accessible if address translation has already been performed.

7. The computer system of claim 5, wherein the checking and using are performed in response to a request to access the unit of memory, said request being received by a memory access component of an emulator of the processing environment from an interpreter component of the emulator.

8. The computer system of claim 5, wherein the method further includes adding one or more designations of a unit of memory to the data structure, in response to a determination that address translation and access monitoring relating to the unit of memory are not needed while the unit of memory is represented in the data structure.

9. The computer system of claim 5, wherein the method further includes removing a designation of a unit of memory from the data structure, in response to an indication that at least one of address translation and access monitoring is to be performed.

10. A computer program product for facilitating access to memory of a processing environment, the computer program product comprising:
   a storage medium readable by a processor and storing instructions for execution by the processor for performing a method comprising:
      checking a data structure of the processing environment to determine whether a unit of memory is readily accessible, said data structure representing one or more units of memory that are readily accessible and excluding units of memory that are not readily accessible, wherein a unit of memory represented in the data structure is a unit of memory that is accessible and a determination has been made that accesses to that unit of memory do not require monitoring; and
      using a designation in the data structure to access the unit of memory, in response to the checking indicating the unit of memory is readily accessible.

11. The computer program product of claim 10, wherein the unit of memory is accessible if address translation has already been performed.

12. The computer program product of claim 10, wherein the access monitoring comprises at least one of monitoring whether a store is into cached code, monitoring for program event recording, monitoring for page 0 and monitoring for store stop.

13. The computer program product of claim 10, wherein the checking and using are performed by one or more memory access routines of an emulator of the processing environment.

14. The computer program product of claim 13, wherein the emulator runs on one system architecture and emulates another system architecture of the processing environment.

15. The computer program product of claim 10, wherein the checking and using are performed in response to a request to access the unit of memory, said request being received, by a memory access component of an emulator of the processing environment, from an interpreter component of the emulator.

16. The computer program product of claim 10, wherein the unit of memory comprises a page of memory.

17. The computer program product of claim 10, wherein the designation comprises one or more addresses of the unit of memory.

18. The computer program product of claim 17, wherein the one or more addresses comprises a logical address and a host absolute address of the unit of memory.

19. The computer program product of claim 10, wherein the method further includes adding one or more designations of a unit of memory to the data structure, in response to a determination that address translation and access monitoring relating to the unit of memory are not needed while the unit of memory is represented in the data structure.

20. The computer program product of claim 1, wherein the data structure comprises an instruction data structure usable in fetching instructions from memory of the processing environment and another data structure usable in fetching data from the memory.

21. The computer program product of claim 10, wherein the method further includes removing a designation of a unit of memory from the data structure, in response to an indication that at least one of address translation and access monitoring is to be performed.

22. A computer program product for facilitating access to memory of a processing environment, the computer program product comprising:
   a storage medium readable by a processor and storing instructions for execution by the processor for performing a method comprising:
      determining whether address translation has been performed for a unit of memory;
      including a designation of the unit of memory in a first data structure, in response to the determining indicating that address translation has been performed, said first data structure comprising one or more designations of one or more units of memory that are address translated, and excluding designations of units of memory that still need address translation;
      determining whether access monitoring relating to the unit of memory is to be performed; and
      including a designation of the unit of memory in a second data structure, in response to a determination that address translation has been performed and access monitoring need not be performed, said second data structure comprising one or more designations of one or more units of memory that are address translated and do not need access monitoring relating to the unit of memory, and excluding designations of units of memory that do need address translation or access monitoring.

23. A computer program product for facilitating access to memory of a processing environment, the computer program product comprising:
   a storage medium readable by a processor and storing instructions for execution by the processor for performing a method comprising:

determining whether access to a unit of memory is to be monitored to determine whether a store is to be performed into just-in-time (JIT) code of a unit of memory;

deciding whether address translation of the unit of memory is to be performed; and selectively including a designation of the unit of memory in one or more data structures usable in facilitating memory access, in response to the determining and deciding, wherein the selectively including comprises:

including the designation in a first data structure, in response to the deciding indicating that address translation need not be performed, said first data structure comprising one or more designations of one or more units of memory that have been address translated or do not need address translation and excluding designations of units of memory that need address translation; and including a designation of the unit of memory in a second data structure, in response to the deciding indicating that address translation need not be performed and the determining indicating that the monitoring is not to be performed, said second data structure comprising one or more designations of one or more units of memory that do not need address translation and access monitoring, and excluding designations of units of memory that do need address translation or access monitoring.

24. A computer program product for facilitating access to memory of a processing environment, the computer program product comprising:

a storage medium readable by a processor and storing instructions for execution by the processor for performing a method comprising:

determining whether access to a unit of memory is to be monitored to determine whether program event recording monitoring is active;

deciding whether address translation of the unit of memory is to be performed; and selectively including a designation of the unit of memory in one or more data structures usable in facilitating memory access, in response to the determining and deciding, wherein the selectively including comprises:

including the designation in a first data structure, in response to the deciding indicating that address translation need not be performed, said first data structure comprising one or more designations of one or more units of memory that have been address translated or do not need address translation and excluding designations of units of memory that need address translation; and including a designation of the unit of memory in a second data structure, in response to the deciding indicating that address translation need not be performed and the determining indicating that the monitoring is not to be performed, said second data structure comprising one or more designations of one or more units of memory that do not need address translation and access monitoring, and excluding designations of units of memory that do need address translation or access monitoring.

25. A computer program product for facilitating access to memory of a processing environment, the computer program product comprising:

a storage medium readable by a processor and storing instructions for execution by the processor for performing a method comprising:

determining whether access to a unit of memory is to be monitored to determine whether the unit of memory is page 0;

deciding whether address translation of the unit of memory is to be performed; and selectively including a designation of the unit of memory in one or more data structures usable in facilitating memory access, in response to the determining and deciding, wherein the selectively including comprises:

including the designation in a first data structure, in response to the deciding indicating that address translation need not be performed, said first data structure comprising one or more designations of one or more units of memory that have been address translated or do not need address translation and excluding designations of units of memory that need address translation; and including a designation of the unit of memory in a second data structure, in response to the deciding indicating that address translation need not be performed and the determining indicating that the monitoring is not to be performed, said second data structure comprising one or more designations of one or more units of memory that do not need address translation and access monitoring, and excluding designations of units of memory that do need address translation or access monitoring.

26. A computer program product for facilitating access to memory of a processing environment, the computer program product comprising:

a storage medium readable by a processor and storing instructions for execution by the processor for performing a method comprising:

determining whether access to a unit of memory is to be monitored to determine whether store stop is active;

deciding whether address translation of the unit of memory is to be performed; and selectively including a designation of the unit of memory in one or more data structures usable in facilitating memory access, in response to the determining and deciding, wherein the selectively including comprises:

including the designation in a first data structure, in response to the deciding indicating that address translation need not be performed, said first data structure comprising one or more designations of one or more units of memory that have been address translated or do not need address translation and excluding designations of units of memory that need address translation; and including a designation of the unit of memory in a second data structure, in response to the deciding indicating that address translation need not be performed and the determining indicating that the monitoring is not to be performed, said second data structure comprising one or more designations of one or more units of memory that do not need address translation and access monitoring, and excluding designations of units of memory that do need address translation or access monitoring.

* * * * *